United States Patent
Dhong et al.

(10) Patent No.: US 6,334,184 B1
(45) Date of Patent: *Dec. 25, 2001

(54) PROCESSOR AND METHOD OF FETCHING AN INSTRUCTION THAT SELECT ONE OF A PLURALITY OF DECODED FETCH ADDRESSES GENERATED IN PARALLEL TO FORM A MEMORY REQUEST

(75) Inventors: Sang Hoo Dhong, Austin, TX (US); Joel Abraham Silberman, Somers, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/046,872

(22) Filed: Mar. 24, 1998

(51) Int. Cl.$^7$ ........................................... G06F 9/32
(52) U.S. Cl. ..................... 712/235; 712/236; 711/213; 711/218
(58) Field of Search .................. 712/235, 236, 712/234, 254; 711/218, 202, 213

(56) References Cited

U.S. PATENT DOCUMENTS

| | | | | |
|---|---|---|---|---|
| 5,185,868 | * | 2/1993 | Tran ........................................ | 712/217 |
| 5,495,598 | * | 2/1996 | Byers et al. ........................... | 371/20.1 |
| 5,535,346 | * | 7/1996 | Thomas, Jr. ........................... | 712/217 |
| 5,724,563 |   | 3/1998 | Hasegawa .............................. | 712/233 |
| 5,796,998 | * | 8/1998 | Levitan et al. ........................ | 712/239 |
| 5,911,153 |   | 6/1999 | Dhong et al. .                      |       |
| 5,926,628 | * | 7/1999 | Tran et al. ............................. | 710/113 |
| 5,964,869 | * | 10/1999 | Talcott et al. ........................ | 712/236 |
| 5,974,543 | * | 10/1999 | Hilgendorf et al. ................. | 712/240 |
| 6,112,299 | * | 8/2000 | Ebcioglu et al. ..................... | 712/236 |

FOREIGN PATENT DOCUMENTS

| | | |
|---|---|---|
| 0927930A1 | 7/1999 | (EP) . |
| 2-47725 (A) | 2/1990 | (JP) . |
| 3-75932 (A) | 3/1991 | (JP) . |
| 4-125733 (A) | 4/1992 | (JP) . |
| 4-167026 (A) | 6/1992 | (JP) . |
| 5108345A | 4/1993 | (JP) . |
| 5-224928 (A) | 9/1993 | (JP) . |
| 08-314720 | 11/1996 | (JP) . |
| 08314720A | 11/1996 | (JP) . |

OTHER PUBLICATIONS

"A Method For Handling Double Branches In Zero Cycles," Research Disclosure, No. 327, Jul. 1991, Emsworth, GB.
European Patent Office Search Report.

* cited by examiner

Primary Examiner—Thomas Lee
Assistant Examiner—Gautam R. Patel
(74) Attorney, Agent, or Firm—Casimer K. Salys; Bracewell & Patterson, L.L.P.

(57) ABSTRACT

A processor and method of fetching an instruction from a memory are disclosed. According to the method of the present invention, a plurality of target addresses are determined utilizing a plurality of previously fetched instructions, and a sequential address is determined utilizing a last of the plurality of previously fetched instructions. Concurrently with the determination of the target addresses and the sequential address, a select signal specifying one of the plurality of target addresses or the sequential address is generated. The select signal is used to select one of the plurality of target addresses or the sequential address as a memory request address. The memory request address is then transmitted from the processor to the memory so that the memory will supply at least one instruction to the processor. By generating the target addresses and sequential address concurrently with the generation of the selection signal, instruction fetch latency is reduced.

17 Claims, 3 Drawing Sheets

PROCESSOR AND METHOD OF FETCHING AN INSTRUCTION THAT SELECT ONE OF A PLURALITY OF DECODED FETCH ADDRESSES GENERATED IN PARALLEL TO FORM A MEMORY REQUEST

BACKGROUND OF THE INVENTION

1. Technical Field

The present invention relates in general to a method and system for data processing and, in particular, to a processor and method for generating a memory request address in a processor. Still more particularly, the present invention relates to a processor that decodes multiple instructions, generates, in parallel, a fetch address from each decoded instruction, and then selects one of the generated fetch addresses as a memory request address.

2. Description of the Related Art

A processor may include an instruction queue from which instructions are dispatched to one or more execution units for execution and an instruction fetcher that calculates fetch addresses and uses the fetch addresses to retrieve instructions from memory to fill the instruction queue. In a conventional processor, priority logic is utilized to determine which instruction in the instruction queue should be utilized to generate the next fetch address. Following selection of an instruction by the priority logic, a fetch address is generated from the instruction, typically by adding an instruction-length offset to the address of the selected instruction. The fetch address generated from the selected instruction is then passed to a memory as a request address in order to obtain one or more instructions stored at the memory location specified by the request address. Thus, the conventional instruction fetch cycle is comprised of a number of steps that are performed sequentially.

The time interval beginning with the examination of instructions in the instruction queue and ending with the receipt of the fetched instructions from memory may be referred to as the instruction fetch cycle time. In efforts to decrease a processor's instruction fetch cycle time and therefore enhance the overall performance of the processor, attention is typically focused on improving the design and configuration of the individual components of the memory, for example, by adopting faster memory technologies, improving instruction cache hit rates, and incorporating additional levels of cache on-chip with the processor. While these solutions certainly can improve instruction fetch cycle time, the present invention includes a recognition that instruction fetch cycle time can also be decreased by parallelizing steps within the instruction fetch cycle.

SUMMARY OF THE INVENTION

It is therefore one object of the present invention to provide an improved method and system for data processing.

It is another object of the present invention to provide an improved processor and method for generating a memory request address in a processor.

It is yet another object of the present invention to provide a processor that decodes multiple instructions, generates, in parallel, a fetch address from each decoded instruction, and then selects one of the generated fetch addresses as a memory request address.

The foregoing objects are achieved as is now described. According to the method of the present invention, a plurality of target addresses are determined by a processor utilizing a plurality of previously fetched instructions, and a sequential address is determined utilizing a last of the plurality of previously fetched instructions. Concurrently with the determination of the target addresses and the sequential address, a select signal specifying one of the plurality of target addresses or the sequential address is generated. The select signal is used to select one of the plurality of target addresses or the sequential address as a memory request address. The memory request address is then transmitted from the processor to the memory so that the memory will supply at least one instruction to the processor. By generating the target addresses and sequential address concurrently with the generation of the selection signal, instruction fetch latency is reduced.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF ILLUSTRATIVE EMBODIMENT

Figure 1:
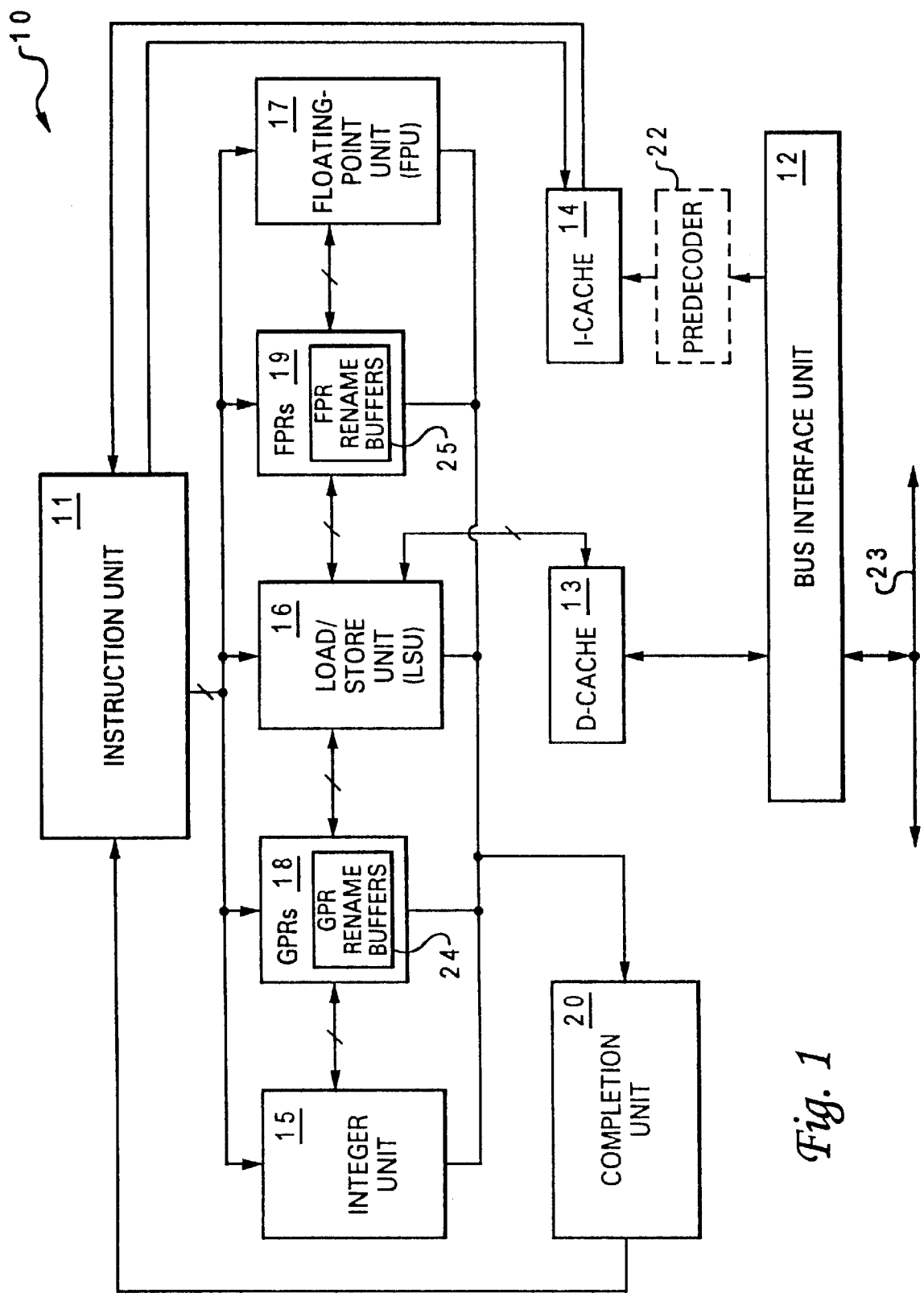
FIG. 1 depicts an illustrative embodiment of a data processing system with which the method and system of the present invention may advantageously be utilized.

With reference now to the figures and in particular with reference to FIG. 1, there is depicted a block diagram of an illustrative embodiment of a processor, indicated generally at 10, for processing instructions and data in accordance with the invention recited in the appended claims. In the depicted illustrative embodiment, processor 10 comprises a single ID integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC™ line of microprocessors available from IBM Microelectronics, which operates according to reduced instruction set computing (RISC) techniques; however, those skilled in the art will appreciate from the following description that the present invention is also applicable to any other processor.

As illustrated in FIG. 1, processor 10 is coupled to processor bus 23 via a bus interface unit (BIU) 12 within processor 10. BIU 12 controls the transfer of information between processor 10 and other devices coupled to processor bus 11, such as an external level two (L2) cache or main memory (not illustrated), by participating in bus arbitration. Processor 10, processor bus 23, and the other devices coupled to processor bus 11 together form a data processing system.

BIU 12 is connected to instruction (I) cache 14 and data (D) cache 13 within processor 10. High-speed caches such as I-cache 14 and D-cache 13 enable processor to achieve relatively fast access time to a subset of data or instructions previously transferred from lower levels of memory to the caches, thus improving the performance of the host data processing system. I-cache 14 is further coupled to instruction unit 11, which fetches instructions from I-cache 14 during each cycle. Instruction unit 11 processes branch instructions internally, but dispatches sequential instructions to the sequential execution circuitry of processor 10 for execution.

In the depicted illustrative embodiment, the sequential execution circuitry includes integer unit 15, load/store unit (LSU) 16, and floating-point unit (FPU) 17. Each of execution units 15–17 typically executes one or more instructions of a particular type of sequential instructions during each processor cycle. For example, integer unit 15 performs mathematical and logical operations such as addition, subtraction, ANDing, Oring, and XORing on integer operands received from specified general purpose registers (GPRs) 18 or GPR rename buffers. Following the execution of an instruction, integer unit 15 outputs the resulting data, if any, of the instruction to GPR rename buffers 24, which provide temporary storage for the result data until the instruction is completed under the direction of completion unit 20 by transferring the result data from GPR rename buffers 24 to one or more of GPRs 18.

FPU 17 typically performs single and double-precision floating-point arithmetic and logical operations, such as floating-point multiplication and division, on source operands received from floating-point registers (FPRs) 19 or FPR rename buffers 25. FPU 30 outputs data resulting from the execution of floating-point instructions to selected FPR rename buffers 25, which temporarily store the result data until the instructions are completed under the direction of completion unit 20 by transferring the result data from FPR rename buffers 25 to selected FPRs 19.

As its name implies, LSU 16 typically executes floating-point and fixed-point instructions that either load data from memory (i.e., either D-cache 13 or main memory) into selected GPRs 18 or FPRs 19 or that store data from a selected one of GPRs 18, GPR rename buffers 24, FPRs 19, or FPR rename buffers 15 to memory. Processor 10 may optionally include a predecoder 22 interposed between BIU 12 and I-cache 14 that predecodes instructions received from lower level memory prior to storing the predecoded instruction in I-cache 14. Such predecoding may include, for example, placing branch instructions in a uniform format that facilitates streamlined processing by instruction unit 11.

Processor 10 preferably employs both pipelining and out-of-order execution of instructions to further improve the performance of its superscalar architecture. Accordingly, instructions can be executed by integer unit 15, LSU 16, and FPU 17 in any order as long as data dependencies are observed. In addition, instructions are processed by processor 10 at a sequence of pipeline stages, including fetch, decode/dispatch, execute, finish, and completion. In accordance with the present invention and as discussed in detail below, the overall performance of processor 10 is enhanced by decreasing the instruction fetch cycle time of the fetch pipeline stage.

Figure 2:
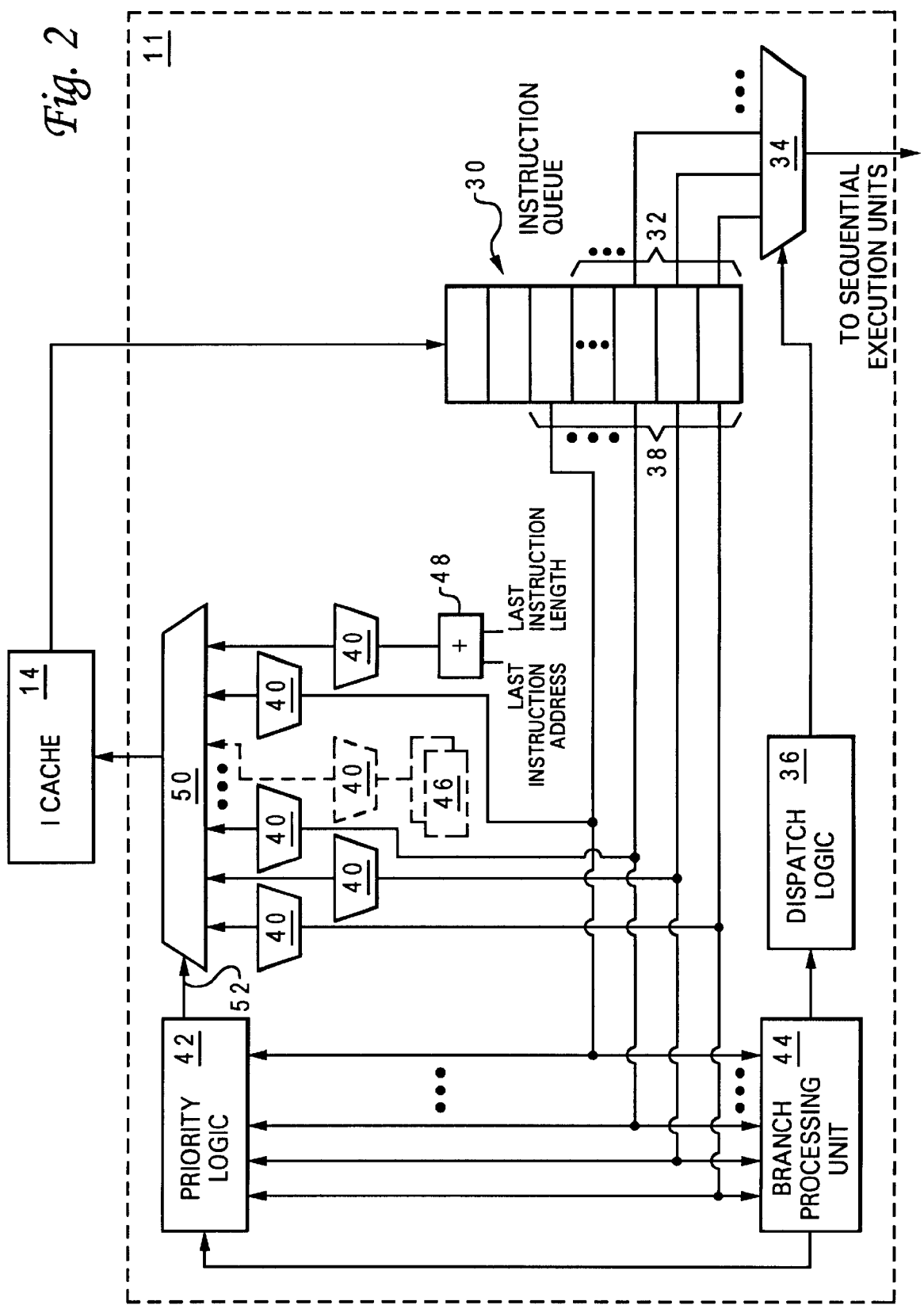
FIG. 2 is a more detailed block diagram of the instruction unit of the data processing system illustrated in FIG. 1.

Referring now to FIG. 2, there is depicted a more detailed block diagram of instruction unit 11. As illustrated, instruction unit 11 includes instruction queue 30, which includes an implementation-dependent number of entries that temporarily store instructions fetched from I-cache 14. Instructions are loaded into the entries of instruction queue 30 in program order, beginning with the bottom entry. Instructions within dispatch window 32, which represent the oldest instructions in instruction queue 30, are presented to multiplexer 34 for dispatch during each cycle of the processor clock. Upon assertion of appropriate select signals by dispatch logic 36, one or more instructions are dispatched to sequential execution units 15–17 for execution and are removed from instruction queue 30. Instructions remaining in instruction queue 30 are shifted down as instructions are removed upon dispatch. Depending upon the desired implementation, dispatch logic 36 may be constrained to dispatch instructions in program order as execution resources (e.g., an execution unit and operands) become available or, in the alternative, may be capable of verifying the observation of data dependencies and dispatching instructions out of program order.

As shown in FIG. 2, instruction queue 30 also has an associated fetch window 38, which may partially or fully overlap dispatch window 32 or be disjoint from dispatch window 32. Each instruction within fetch window 38 is received as an input by a corresponding one of decoders 40, as well as by priority logic 42 and branch processing unit (BPU) 44. Decoders 40 operate on the assumption that each instruction within fetch window 38 is a branch instruction. Accordingly, in response to receipt of an instruction, each of decoders 40 decodes its respective instruction as if it were a branch instruction to determine a decoded target address to which execution should branch if the "branch" were taken. The decoded target addresses determined by decoders 40 form the inputs of multiplexer 50.

The manner in which the instructions are decoded by decoders 40 depends upon both the architecture of the instruction set executed by processor 10 and the desired logic complexity. In the simplest case in which all branch instructions specify or are assumed to specify immediate branches, decoders 40 may simply utilize the value of an immediate field of the branch instruction to determine a decoded target address. In embodiments of processor 10 in which relative branching is supported, predecoder 22 of FIG. 1 is preferably utilized to preprocess relative branches and immediate branches into a consistent format so that both immediate and relative branch instructions can be processed identically by decoders 40. This preprocessing may entail, for example, the extension of each branch instruction to include an additional multi-bit (e.g., 5 bit) branch field that can utilized by decoders 40 to compute a decoded target address. An even more complex embodiment may also support register indirect branches, which specify that program flow is to branch to an address within an architected register, such as one of the PowerPC™ link and count registers. In this embodiment, the contents of architected registers 46, which may contain addresses for register indirect branching, are preferably decoded by a decoder 40 and then input into multiplexer 50.

As discussed further below, the address of the last (in program order) instruction in instruction queue 30, which may or may not be within fetch window 38, is input into adder 48 together with the instruction's length. Adder 48 computes the sum of the instruction address and instruction length, which sum specifies the address of the next sequential instruction. The sequential instruction address is then decoded by a decoder 40 and input into multiplexer 50. Thus, all of the addresses input into multiplexer 50 are decoded addresses.

Concurrent with the operation of decoders 40 and adder 48, priority logic 42 determines which, if any, of the instructions within fetch window 38 are actually branch instructions and which of the branch instructions is the earliest (in program order) unprocessed branch instruction in fetch window 38. In addition, BPU 44 determines which, if any, of the branch instructions in fetch window 38 should be taken. Thus, BPU 44 indicates to priority logic 42 which instructions are unconditional branch instructions, conditional branch instructions resolved as taken, or conditional branch instructions that are predicted as taken utilizing either static or dynamic branch prediction. As will be understood by those skilled in the art, static predictions are typically based upon bits associated with the branch instruction by the compiler, while dynamic predictions are typically based, at least in part, upon the instruction address of the branch instructions. As illustrated, BPU 44 also provides branch predictions and branch resolutions to dispatch logic 36, which utilizes the branch predictions and branch resolutions to generate the select signal that controls multiplexer 34.

Based upon the inputs received from BPU 44 and determination of which instruction in fetch window 38, if any, is the earliest unprocessed branch instruction, priority logic 42 generates decoded select signals 52, which are preferably equal in number to the inputs of multiplexer 50. Select signals 52 cause multiplexer 50 to select as an memory request address the decoded input address corresponding to an active select signal. In response to receipt of the memory request address, I-cache 14 supplies one or more instructions associated with the memory request address to instruction queue 30. Importantly, because the memory request address is decoded by one of decoders 40 in instruction unit 11 prior to receipt of the memory request address by I-cache 14, the need for I-cache 14 to decode the memory request address is eliminated. This results in a reduction in the instruction fetch cycle time since the address decode is performed by decoders 40 in parallel with the operation of priority logic 42.

Figure 3:
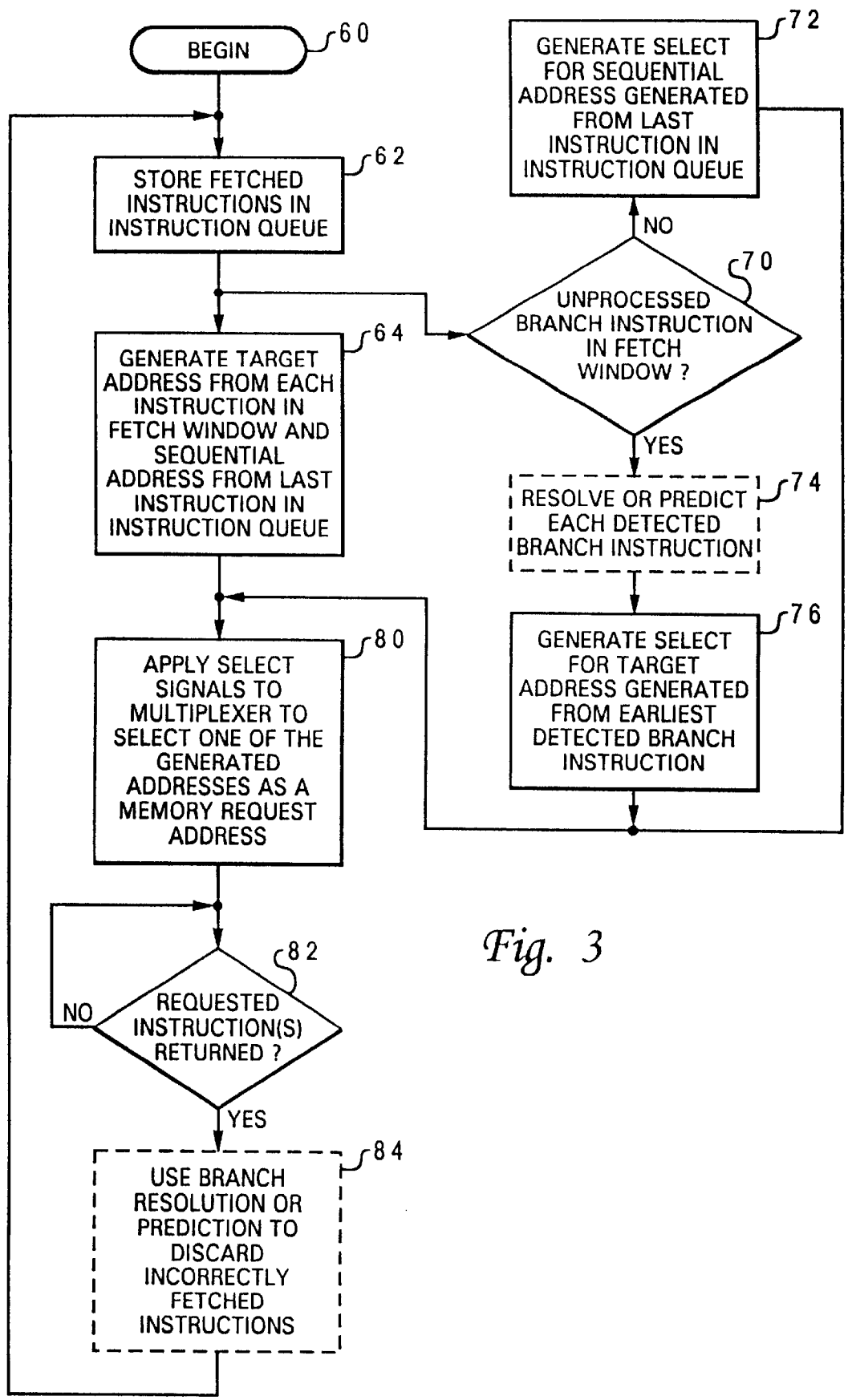
FIG. 3 is a logical flowchart depicting a method of fetching instructions from memory in accordance with the present invention.

With reference now to FIG. 3, there is depicted a high level logical flowchart of an exemplary method of fetching instructions in accordance with the present invention. As illustrated, the process begins at block 60 and thereafter proceeds to block 62, which depicts the storage of one or more fetched instructions within entries at the top of instruction queue 30. Although instruction queue 30 has been described supra as a shifting queue in which entries are shifted towards the bottom of instruction queue 30 as preceding entries are removed, it should be understood that the present invention is equally applicable to other implementations of instruction queue 30, for example, a circular queue. The process then proceeds from block 62 to block 64, which illustrates decoders 40 determining target from each instruction in fetch window 38. In addition, block 64 represents adder 48 calculating the next sequential fetch address from the address of the last instruction in instruction queue 30 and the length of the last instruction.

In parallel with the operations represented by block 64, the operations represented by blocks 70–76 are performed by priority logic 42 and BPU 44. Referring now to block 70, a determination is made by priority logic 42 whether or not fetch window 38 contains an unprocessed branch instruction. In response to a determination at block 70 that fetch window 38 does not contain an unprocessed branch instruction, the process passes to is block 72, which depicts priority logic 42 generating appropriate select signals to select the sequential fetch address as the memory request address. Then process then proceeds to block 80, which is described below.

Returning to block 70, in response to a determination by priority logic 42 that fetch window 38 contains an unprocessed branch instruction, the process passes to block 74. Block 74 depicts 2PU 44 resolving or predicting each branch instruction in instruction window 38. Although block 74 is illustrated as following block 70, it should be understood that the operations depicted in blocks 70 and 74 can be performed either sequentially or in parallel, depending upon timing considerations. In other words, in order to minimize instruction fetch cycle time, the delay associated with blocks 70–76 must be no longer than the longest of the delays of decoders 40 and adder 48. Accordingly, if necessitated by timing considerations, block 74 can optionally be omitted (as indicated by dashed line illustration), and all branches can be assumed to be taken. In this embodiment, BPU 44 can be used to subsequently cancel instructions within mispredicted execution paths, as discussed further below with respect to block 84. The process proceeds from block 74 to block 76, which depicts priority logic 42 generating select signals to select the target address determined from the earliest unprocessed branch instruction within instruction window 38. The selected target address may be output by one of the decoders 40 associated with an instruction in fetch window 38, or if register indirect branch instructions are supported, the decoder 40 associated with architected registers 46. Thereafter, the process passes to block 80.

Block 80 illustrates multiplexer 50 selecting at least one of its decoded input addresses as a memory request address in response to select signals 52. The memory request address is then transmitted from multiplexer 50 to I-cache 14. In cases in which a speculative branch target address is supplied to I-cache 14 as the memory request address, priority logic 42 may also generate select signals 52 that cause multiplexer 50 to supply the sequential address computed by adder 48 to I-cache 14 as a secondary fetch address. In this manner, if the target address is resolved as correct, the instructions within the sequential path can be discarded. Alternatively, if the target address is later determined to be within a mispredicted execution path, the instructions within the mispredicted path can be discarded, and instruction processing can proceed with instructions within the sequential execution path without incurring additional latency.

Following block 80, the process passes to block 82, which represents a determination of whether or not the instruction or instructions specified by the memory request address have been received within instruction queue 30. If not, the process simply iterates at block 82 until the requested instructions are received. In response to receipt of the requested instructions by instruction queue 30, the instruction fetch cycle is complete, and the process proceeds to optional block 84. Optional block 84 illustrates BPU 44 resolving predicted branches or predicting branch instructions (if prediction is not performed at block 74) to determine which, if any, of the fetched instructions should be discarded. Importantly, the operation illustrated at block 84 is not within the instruction fetch cycle and therefore does not contribute to instruction fetch latency in cases in which branches are correctly predicted. Thereafter, the process returns to block 62.

As has been described, the present invention provides a processor that employs an improved method of instruction fetching to decrease instruction fetch cycle time. In accordance with the present invention, multiple potential memory request addresses are generated, and in parallel with the generation of the addresses, at least one of the addresses is selected as a memory request address. By overlapping the generation of the addresses with the selection of an address, overall instruction fetch cycle time is reduced. As discussed hereinabove, the potential memory request addresses are preferably decoded prior to selection of one of the addresses as a memory request address so that address decoding is not performed in a critical timing path.

While the invention has been particularly shown described with reference to a preferred embodiment, it will be understood by those skilled in the art that various changes in form and detail may be made therein without departing from the spirit and scope of the invention.

What is claimed is:

1. A method within a processor of fetching an instruction from a memory, said method comprising:

determining a plurality of decoded target addresses from a plurality of previously fetched instructions utilizing a plurality of address decoders and determining a decoded sequential address from a last of said plurality of previously fetched instructions utilizing an address decoder;

generating a select signal specifying one of said plurality of decoded target addresses or said decoded sequential address, wherein the select signal is generated concurrently with said determination of said plurality of decoded target addresses and said decoded sequential address to accelerate memory access;

selecting one of said plurality of decoded target addresses or said decoded sequential address as a decoded memory request address utilizing said is select signal; and transmitting said decoded memory request address from said processor to said memory so that said memory will supply at least one instruction to said processor.

2. The method of claim 1, and further comprising:

storing said plurality of previously fetched instructions within an instruction queue from which instructions are dispatched by said processor.

3. The method of claim 1, said generating step comprising:

determining whether or not said plurality of previously fetched instructions includes a branch instruction;

in response to a determination that said plurality of previously fetched instructions includes a branch instruction, generating a select signal specifying a decoded target address among said plurality of decoded target addresses determined from said branch instruction; and in response to a determination that said plurality of previously fetched instructions does not include a branch instruction, generating a select signal specifying said decoded sequential address.

4. The method of claim 3, wherein:

said method further comprises determining whether a target execution path specified by said branch instruction should be taken; and said step of generating a select signal specifying a decoded target address among said plurality of decoded target addresses determined from said branch instruction is performed only in response to a determination that said target execution path specified by said branch instruction should be taken.

5. The method of claim 1, wherein said plurality of previously fetched instructions includes a first branch instruction and a second branch instruction, said generating step comprising generating a select signal specifying a decoded target address determined from an earliest in program order of said first branch instruction and said second branch instruction.

6. The method of claim 1, said selecting step comprising selecting one of said plurality of decoded target addresses and said decoded sequential address as a decoded memory request address utilizing a multiplexer.

7. A processor, comprising.

means for determining a plurality of decoded target addresses from a plurality of previously fetched instructions and for determining a decoded sequential address from a last of said plurality of previously fetched instructions;

means for generating a select signal specifying one of said plurality of decoded target addresses or said decoded sequential address, wherein said means for generating generates the select signal concurrently with said determination of said plurality of decoded target addresses and said decoded sequential address to accelerate memory access;

means for selecting one of said plurality of decoded target addresses or said decoded sequential address as a decoded memory request address utilizing is said select signal;

means for transmitting said decoded memory request address from said processor to a memory so that said memory will supply at least one instruction to said processor; and means for executing instructions.

8. The processor of claim 7, and further comprising an instruction queue for storing said plurality of previously fetched instructions, wherein instructions are dispatched from said instruction queue by said processor.

9. The processor of claim 7, wherein said means for generating comprises:

means for determining whether or not said plurality of previously fetched instructions includes a branch instruction;

means, responsive to a determination that said plurality of previously fetched instructions includes a branch instruction, for generating a select signal specifying a decoded target address among said plurality of decoded target addresses determined from said branch instruction; and means, responsive to a determination that said plurality of previously fetched instructions does not include a branch instruction, for generating a select signal specifying said decoded sequential address.

10. The processor of claim 9, wherein:

said processor further comprises means for determining whether a target execution path specified by said branch instruction should be taken; and said means for generating a select signal specifying a decoded target address among said plurality of decoded target addresses that was determined from said branch instruction generates said select signal only in response to a determination that said target execution path specified by said branch instruction should be taken.

11. The processor of claim 7, wherein said plurality of previously fetched instructions includes a first branch instruction and a second branch instruction, said means for generating comprising means for generating a select signal specifying a decoded target address determined from an earliest in program order of said first branch instruction and said second branch instruction.

12. The processor of claim 7, wherein said means for selecting comprises a multiplexer.

13. A processor having an associated memory, said processor comprising:

an execution unit that executes dispatched instructions;

an instruction queue that can contain a plurality of instructions to be dispatched;

address determination circuitry that determines a plurality of decoded target addresses and a decoded sequential address from a plurality of previously fetched instructions contained within said instruction queue, said address determination circuitry including a plurality of address decoders; and priority logic that selects one of said plurality of decoded target addresses or said decoded sequential address as a decoded memory request address, wherein said priority logic determines which of said plurality of decoded target address to select concurrently with said determination of said plurality of decoded-target addresses and-said decoded sequential address by said address determination circuitry to accelerate access to the associated memory.

14. The processor of claim 13, said priority logic comprising:

means for determining whether or not said plurality of previously fetched instructions includes a branch instruction;

means, responsive to a determination that said plurality of previously fetched instructions includes a branch instruction, for generating a select signal specifying a target address among said plurality of target addresses determined from said branch instruction; and means, responsive to a determination that said plurality of previously fetched instructions does not include a branch instruction, for generating a select is signal specifying said sequential address.

15. The processor of claim 14, and further comprising:

a branch processing unit, coupled to said priority logic, that determines whether a target execution path specified by said branch instruction should be taken;

wherein said means for generating a select signal specifying a decoded target address among said plurality of decoded target addresses that was determined from said branch instruction generates said select signal only in response to a determination by said branch processing unit that said target execution path specified by said branch instruction should be taken.

16. The processor of claim 13, wherein said plurality of previously fetched instructions includes a first branch instruction and a second branch instruction, and wherein said priority logic selects a decoded target address determined from an earliest in program order of said first branch instruction and said second branch instruction.

17. The processor of claim 13, and further comprising a multiplexer having said plurality of decoded target addresses and said decoded sequential address as inputs, wherein said multiplexer also includes a select input coupled to said priority logic and an output that can be coupled to said memory.

* * * * *

UNITED STATES PATENT AND TRADEMARK OFFICE
CERTIFICATE OF CORRECTION

PATENT NO. : 6,334,184 B1
DATED : December 25, 2001
INVENTOR(S) : Dhong et al.

It is certified that error appears in the above-identified patent and that said Letters Patent is hereby corrected as shown below:

<u>Column 10,</u>
Line 1, delete the word "is."

Signed and Sealed this

Twenty-third Day of April, 2002

Attest:

Attesting Officer

JAMES E. ROGAN
*Director of the United States Patent and Trademark Office*